United States Patent [19]

Saito

[11] 4,097,006
[45] Jun. 27, 1978

[54] MAGNETIC TAPE CASSETTE

[75] Inventor: Shoichi Saito, Tokyo, Japan

[73] Assignee: Olympus Optical Co., Ltd., Tokyo, Japan

[21] Appl. No.: 711,630

[22] Filed: Aug. 4, 1976

[30] Foreign Application Priority Data

| Aug. 11, 1975 | Japan | 50-110648[U] |
| Aug. 12, 1975 | Japan | 50-111300[U] |
| Aug. 14, 1975 | Japan | 50-112166[U] |
| Sep. 10, 1975 | Japan | 50-124567[U] |
| Sep. 12, 1975 | Japan | 50-126672[U] |
| Sep. 12, 1975 | Japan | 50-126673[U] |
| Nov. 19, 1975 | Japan | 50-157232[U] |
| Nov. 22, 1975 | Japan | 50-159017[U] |
| Jan. 27, 1976 | Japan | 51-007786[U] |

[51] Int. Cl.$^2$ .............................................. G11B 23/10
[52] U.S. Cl. ................................ 242/199; 242/76; 360/132
[58] Field of Search ............ 242/199, 200, 198, 197, 242/192, 209, 76, 206; 560/96, 132; 352/78 R, 72

[56] References Cited

U.S. PATENT DOCUMENTS

| 3,432,111 | 3/1969 | Ryder | 242/199 |
| 3,495,787 | 2/1970 | Wallace | 242/199 |
| 3,598,339 | 8/1971 | Saito | 242/199 |
| 3,666,203 | 5/1972 | Sato et al. | 242/199 |
| 3,800,322 | 3/1974 | Schoettle et al. | 242/198 |
| 3,912,194 | 10/1975 | Chan | 242/199 |
| 3,980,256 | 9/1976 | Schwartz et al. | 242/199 |
| 3,991,956 | 11/1976 | Machida | 242/199 |

FOREIGN PATENT DOCUMENTS 2,323,118  11/1973  Germany ........................ 242/199

Primary Examiner—George F. Mautz
Attorney, Agent, or Firm—Ostrolenk, Faber, Gerb & Soffen

[57] ABSTRACT

A magnetic tape cassette includes a cassette body formed by a pair of cassette halves, molded from a synthetic resin material and having a generally the same configuration and dimension, which are joined together at their open ends. A window slot for receiving a pinch roller is centrally formed in the front end face of the cassette body by partitioning posts, which include an inwardly extending edge for limiting crosswise movement of a magnetic tape and which also include protuberances adapted to reduce friction with the tape. A pair of window slots for receiving magnetic heads are symmetrically formed in the front end of the cassette body on the opposite side of the central window slot. An aperture for receiving a capstan is formed in the cassette toward the front end face in alignment with the window slot which is to receive the pinch roller, and is associated with guide walls. A spring abutment is located immediately behind the capstan aperture, and is provided with a nipple or a projection which defines a fulcrum. A length of magnetic tape is disposed on a tape supply hub which is disposed within the cassette, and is pulled therefrom to extend around tape guide members so that it extends along the respective window slots formed in the front end face of the cassette while maintaining its magnetic surface in parallel orientation with the plane of the slots. Subsequently, the tape is taken up on a tape take-up hub also disposed within the cassette. A pad carrying leaf spring is located between the spring abutment and a portion of the magnetic tape which extends along the window slots, and carries tape pads which urges the tape against a magnetic head or heads which are advanced into the respective associated window slots. A pair of positioning apertures are formed in the cassette adjacent to opposite corners located toward the front end face for enabling the cassette to be positioned relative to an associated cassette tape recorder.

7 Claims, 34 Drawing Figures

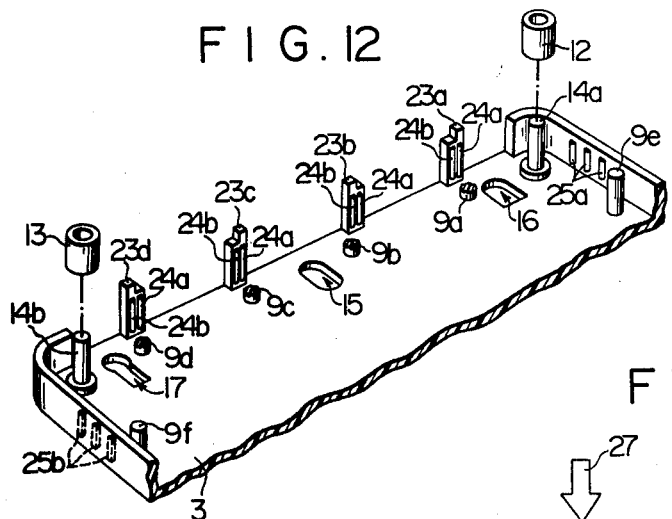
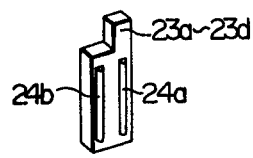
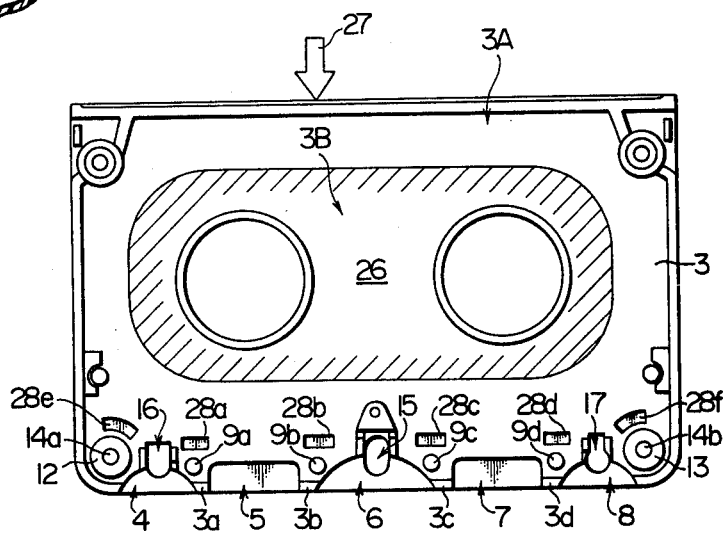
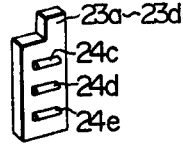
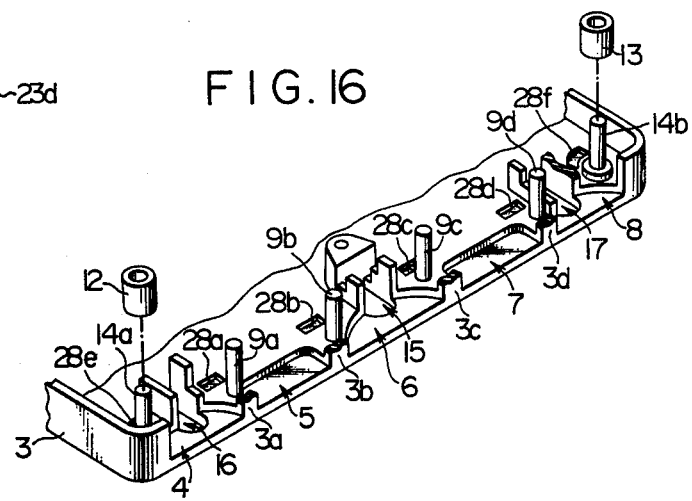

FIG. 26
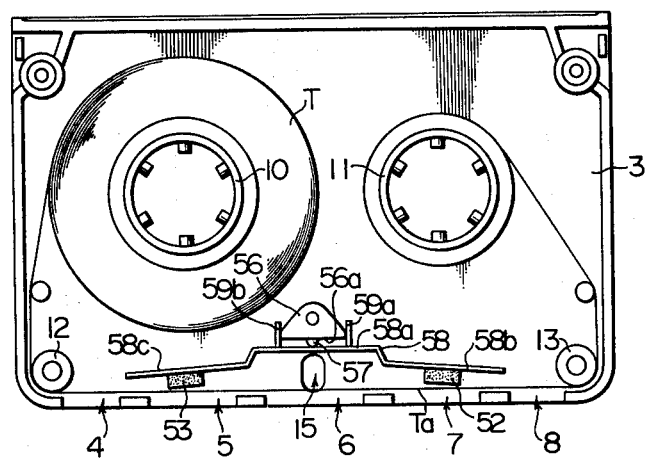
FIG. 27
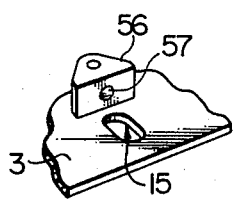
FIG. 28
(a)
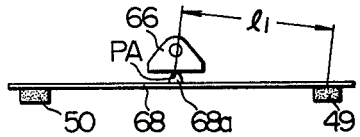
(b)
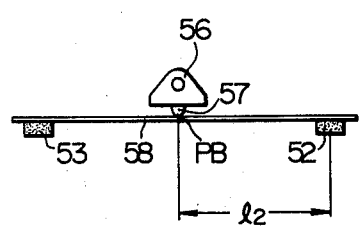

MAGNETIC TAPE CASSETTE

BACKGROUND OF THE INVENTION

The invention relates to a magnetic tape cassette for use in a cassette tape recorder, and more particularly, to a micro-cassette for use in a miniature cassette tape recorder.

As is well recongnized, a magnetic tape cassette is formed by a pair of upper and lower halves of substantially similar configuration and dimension which are molded from a synthetic resin material and which are diposed in abutting relationship against each other at their open ends so as to form a flat, hollows rectangular cassette body. A pair of rotatable tape hubs are spaced apart in the cassette for receiving a length of magnetic tape thereon. A leader end of the tape is pulled from one of the tape hubs, then passed in a taut condition along window slots which are adapted to receive a record/playback head, an erase head and a pinch roller, and then anchored to the other hub to be taken up thereby.

Along one lateral side which is longer than the other side disposed at right angles thereto, the cassette has a front end face in which the above window slots are formed by partitioning posts. The posts are integrally formed with one or both of the cassette halves, and define the respective window slots, partitioning the opening in the front end of the cassette into a plurality of sections, when the cassette halves are disposed in abutting relationship against each other. When advanced into the associated window slot, each of the magnetic heads or pinch roller is brought into abutment against the magnetic tape to provide the intended function.

As is known, a magnetic tape contained in a cassette thus constructed include two tracks, and when the tape is completely taken up on the take-up hub using one of the tracks, the cassette is reversed upside down to use the other track. As a consequence, both halves of the cassette are arranged in a completely symmetrical manner with respect to the parting line therebetween or the longitudinal centerline. In a conventional tape cassette which is commonly referred to as a compact cassette, the window slots are also symmetrically formed in the respective cassette halves, so that two perforating or drilling operations are required to form a capstan aperture. While this involves no difficulty with a cassette having a relatively large dimensions, it is desirable for a miniature cassette or micro-cassette that the number of necessary perforating operations be reduced. If the window slot for the pinch roller is centrally formed with those associated with the magnetic heads located on the opposite sides thereof, a single aperture for the capstan will be sufficient.

When initially pulling a leader end of the tape disposed on the supply hub, it is involved and difficult to pass it between partitioning posts between which the slots are formed and a plurality of tape guide pins which are closely spaced rearwardly therefrom, because of the reduced and hence limited clearance therebetween and because of the reduced thickness of the magnetic tape. In addition, the tape portion which extends along the window slots is not always centrally aligned with the window slots, but may be displaced laterally of the tape in view of the fact that a relatively large tolerance is designed in the internal space within the cassette, in particular in the dimension crosswise of the tape. As a result, if the successive turns of the tape on either tape hub are displaced in the manner of a cone, the position of the tape at each of the window slots will be gradually displaced to one side or the other of its centerline. Also when the cassette is not in use, the absence of tension in the tape results in a slack condition thereof, again causing a crosswise displacement of the tape in the respective window slots.

Usually, partitioning posts, tape guide pins and support pins on which tape guide rollers are mounted are integrally formed with the cassette halves as the latter is molded from a synthetic resin material. Subsequently, the tape is passed between the posts and the guide pins, and it will be noted that when it is located in this manner, a sliding contact may occur between the magnetic surface of the tape and the rear or inner surface of the posts because of the reduced clearance therebetween. Since a magnetic tape has a base which is usually formed of a plastic film material, the contact and friction between the tape and the post may result in the generation of static electricity to charge the post. If it becomes charged, the tape will be attracted toward the post, increasing the frictional torque upon the tape to have a troublesome effect in the tape running and winding. Though a material for a tape cassette is normally admixed with an anti-static agent, it has no effect upon the above mentioned triboelectricity.

When the tape guide pins and the support pins on which the tape guide rollers are mounted are integrally formed with the cassette halves, failure to form them in an upright position from the plane of the major surface of the respective cassette halves may result in a skewed position of the tape during its running, thereby producing a differential degree of contact with the magnetic head or heads when the cassette has its one surface located upside, which is different from the degree of contact when the other surface of the cassette is located up, to thereby degrade the performance of the record/playback operation. In addition, the interchangeability with other type recorders is prevented. Nevertheless it is noted that when molding these pins integrally with the cassette halves, it is unavoidable that the tip end of these pins tilts toward the center of the cassette halves where the gate or the pouring inlet of the molten synthetic resin is usually located during the molding process. Such a tilt results from the tendency of the synthetic resin to constrict as it becomes solidified subsequent to the pouring, exerting a force upon the resin material which is to form the pins, toward the center of the flat area or the cassette half. Such drawback is even more aggravated with a reduction in the size of the tape cassette inasmuch as the pins will have a reduced design dimension.

Usually a pair of liner sheets comprising sheets of ethylene tetrafluoride resin are interposed between the opposite end faces of the magnetic tape and the upper and lower inner surfaces of the cassette in oder to assure a smooth tape running from one of the tape hubs to the other. In the prior art arrangement, each of the liner sheets is disposed within the cassette so that its one surface is entirely in contact with the adjacent inner surface of the cassette, so that the adjacent end or edge face of the tape may become removed from the liner sheet as it drifts vertically during the tape running.

A pad carrying spring which is used in a tape cassette normally comprises a leaf spring which is disposed on the rear side of the tape portion running along the window slots in the front end face of the tape cassette, and carries pads which urge such tape portion against a magnetic head or heads which are advanced into the associated window slots. A fulcrum for the leaf spring is defined by a point of contact between a projection extending from its rear surface and an abutment member, and this arangement causes a poor response of the pads with respect to the magnetic heads. Specifically, the location of the fulcrum which is rearwardly spaced from the spring increases the distance between the pads and the fulcrum, making it difficult to provide an immediate response of the pad as the associated head is advanced into the coresponding window slot. To eliminate such difficulty, the distance between the respective pads and the fulcrum of the leaf spring should preferably be minimized.

In order to assure that a tape cassette is loaded in proper position in tape recorder, cassette positioning apertures are formed in the cassette. Usually, these apertures are located rearwardly of the tape path adjacent to the opposite ends thereof, and the cassette is loaded in position by engaging them with pins which are provided on the part of the tape recorder.

A cassette tape recorder is presently available which permits a record or playback operation in either direction of the tape running, without requiring the cassette to be reversed upside down. By providing a pair of such tape recorders, it is possible to produce a duplicate tape in a reduced time length by running one of the tape recorders in one direction during which a record is made on the tape, which is reproduced in the opposite direction of running, the reproduced signal being fed to the other tape recorder to record it on the tape contained in that tape recorder which is then run in the opposite direction. The duplicate tape can be immediately reproduced by running it in one direction, that is, in the opposite direction from that in which it is run when it is being recorded. The described tape recorder employs the same normal speed in both directions of tape running, so that the same length of time is required in producing the duplicate tape as is required when making a record on the first tape. To overcome this difficulty, there has been a proposal to run the tape at the normal speed during its running in one direction while it is run at twice the normal speed in the opposite direction of its running. A differential tape running speed in the two directions of running can be achieved by (1) using different speeds and directions of rotation of the tape drive capstan for the respective directions of tape running, or (2) by providing a pair of tape drive capstans each associated with one direction of tape running and which has a direction and a speed of rotation which are different from those of the other capstan. In the first instance, it is necessary to swtich the motor speed, to reverse the direction of rotation and to maintain the rotational speed of the capstan at a given value, all of which is not easily achieved. By comparison, the second technique only requires the addition of a second capstan having a different speed and direction of rotation, and the resulting design will be much easier than the first scheme. However, when adopting the second scheme, there must be two window slots for the pinch rollers and two apertures for the capstans. While this may be advantageously achieved in a compact cassette, there is a need for the provision of some accommodating means where a single window slot is provided centrally in the front end face of the cassette for receiving the pinch roller.

SUMMARY OF THE INVENTION

It is a primary object of the invention to provide a magnetic tape cassette including a window slot for receiving a pinch roller which is centrally formed in the front end face of the cassette, and further including a pair of window slots for receiving magnetic heads which are symmetrically located on the opposite sides of the first mentioned window slot, the cassette lending itself to a miniaturization while fully retaining the necessary functions of a tape cassette.

It is another object of the invention to provide a magnetic tape cassette including partitioning posts which define a plurality of window slots in the front end face of the cassette, the posts being provided with inclined surfaces and also with inwardly extending edges on its rear surface which limit a crosswise or lateral shift of the tape.

It is a further object of the invention to provide a magnetic tape cassette in which the inner surface of the cassette is provided with protuberances to minimize the frictional contact between the magnetic surface of the tape and the inner surface of the cassette which may give rise to static electricity.

It is still another object of the invention to provide a magnetic tape cassette in which tape guide pins and support pins for guide rollers are integrally molded as a pair of cassette halves are molded, while maintaining them in a completely upright position relative to the plane of the major surface of respective cassette halves.

It is a still further object of the invention to provide a magnetic tape cassette in which a liner sheet or sheets are supported by the inner surface of the cassette in a floating manner to eliminate substantially any clearance between the liner sheet or sheets and the end face or faces of the tape.

It is an additional object of the invention to provide a magnetic tape cassette including a pad carrying leaf spring which has its fulcrum defined thereon by a nipple or dowel formed on a spring abutment, thereby reducing the distance between pads and the fulcrum to provide an improved pad response.

It is a still further object of the invention to provide a magnetic tape cassette having improved cassette positioning apertures which permit the cassette to be loaded on a cassette tape recorder of the type having a pair of capstans.

According to the invention, there is provided a magnetic tape cassette which can be miniaturized without causing any inconvenience in its manufacture or use. Specifically, a partitioning post which is used to define window slots in the front end face of the tape cassette is provided with an inclined or tapered surface on its rear side, which facilitates the insertion of the magnetic tape into the clearance formed between the post and tape guide pins as the tape is initially passed in a taut condition along the window slots. In addition, at its lower end, the partitioning post is formed with an inwardly projecting edge on its rear surface which prevents a crosswise displacement of the tape, thus preventing the tape from forming a cone on the tape hub on which it is being taken up and assuring a uniform friction of the running tape to provide a favorable record/playback operation. The provision of protuberances on the inner surface of the cassette minimizes its area of contact with the magnetic surface of the tape, and hence minimizes the triboelectricity which might interfere with the tape running and winding. The tape guide pins and support pins on which tape guide rollers are mounted are integrally molded with the cassette halves, and portions of the cassette halves which are located in the wake of the individual pins, namely located toward the center of the cassette halves, have a reduced thickness to promote their earlier solidification, thus preventing a pulling action upon the pins as they set, which pins are thus allowed to remain in a completely upright position relative to the plane of the major surface of the respective cassette halves. Since no nipple or dowel is formed on the pad carrying leaf spring, the accuracy of the spring is improved and the manufacturing step for its forming reduced, thus contributing to a reduction in the manufacturing cost thereof. Finally, the cassette positioning apertures are formed so as to be usable as capstan apertures, thus enabling the cassette to be used in a tape recorder which is provided with a pair of capstans.

BRIEF DESCRIPTION OF THE DRAWINGS

FIG. 12 is a fragmentary perspective view of the cassette half shown in FIG. 11;

FIG. 13 is an enlarged perspective view of a partitioning post shown in FIGS. 11 and 12;

FIG. 14 is an enlarged perspective view of another example of projections;

FIG. 15 is a plan view of the lower half of a magnetic tape cassette constructed in accordance with still another embodiment of the invention and showing the interior thereof;

FIG. 16 is a fragmentary perspective view of the cassette half shown in FIG. 15;

FIG. 26 is an interior plan view of the lower half of a magnetic tape cassette constructed in accordance with still another embodiment of the invention;

FIG. 27 is a perspective view of a spring abutment shown in FIG. 26;

FIGS. 28(a) and (b) are diagrammatic views of the leaf spring, illustrating its manner of operation;

DETAILED DESCRIPTION OF EMBODIMENTS

Figure 1:
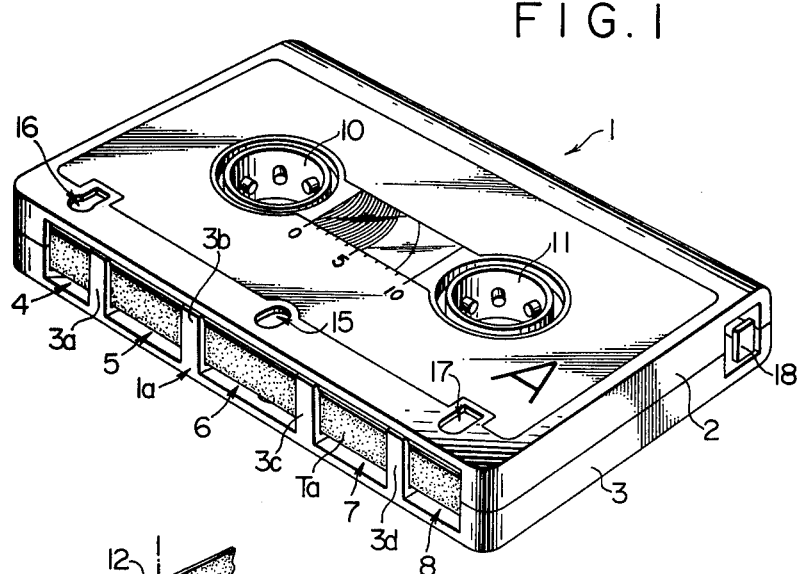
FIG. 1 is a perspective view of a magnetic tape cassette constructed in accordance with one embodiment of the invention.

Referring to FIG. 1, there is shown a perspective view of a miniature magnetic tape cassette 1 which is constructed in accordance with the invention. The cassette 1 comprises an upper half 2 and a lower half 3 which are molded from a synthetic resin material so as to have substantially similar configurations and dimentions both halves being disposed in abutting relationship at their open ends and secured together as by screws to form a flat, rectangular cassette structure. Along its one lateral side which is longer than the other side disposed at right angles thereto, the cassette includes a front end face 1a. The lower cassette half 3 is integrally formed with a plurality of partitioning posts 3a, 3b, 3c, 3d which define a plurality of window slots 4, 5, 6, 7 and 8. The centrally located window slot 6 is adapted to receive a pinch roller while the immediately adjacent window slots 5 and 7 are adapted to receive record/playback magnetic heads. The end window slots 4, 8 which are most remote from the central slot 6 are adapted to receive erase magnetic heads.

Figure 2:
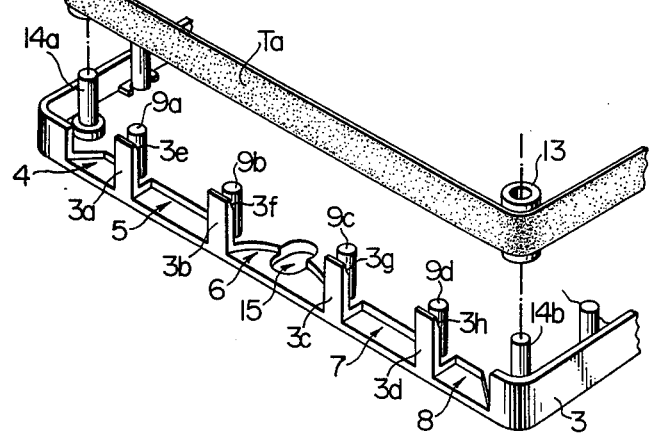
FIG. 2 is a perspective view of part of the lower half of the cassette shown in FIG. 1 together with part of a magnetic tape.
Figure 3:
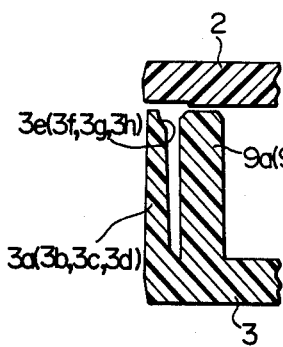
FIG. 3 is an enlarged fragmentary cross section of the tape cassette shown in FIG. 1.

As shown in FIG. 2, a plurality of tape guide pins 9a, 9b, 9c, and 9d extend uprightly and are located immediately behind the respective posts 3a to 3d. These guide pins 9a to 9d are also integrally formed with the lower half 3, and cooperate with the posts 3a to 3d to form a clearance therebetween, through which a portion of a magnetic tape contained within the cassette is passed so as to extend along the respective window slots. As shown in FIGS. 1 to 3, the inner surface at the free end of the posts 3a to 3d is formed as an inclined or tapered surface 3e, 3f, 3g, 3h, tapering toward the tip end. When disposing a magnetic tape in the cassette 1, its opposite ends are anchored to a pair of tape supply hub and tape take-up hub 10, 11 (see FIG. 1), and the leader portion of the tape extending from one of the tape hubs is mounted in the lower half 3 by rotatably fitting the respective hubs 10, 11 into corresponding openings formed in the cassette half 3, and passing a portion Ta of the tape reeled off one of the tape hubs around a pair of tape guide rollers 12, 13 (see FIG. 2) while inserting the tape portion Ta into the clearance formed between the posts 3a to 3d and the pins 9a to 9d. The guide rollers 12, 13 are rotatably mounted on pins 14a, 14b which are located on the opposite sides of the tape guide pins 9a to 9d in an upright position. The insertion is facilitated by the tapered surfaces 3e to 3h of the posts 3a to 3d.

Subsequent to the insertion, and after a pad carrying leaf spring and liner sheets are disposed in position as will be further described later, the upper half 2 is disposed in abutting relationship with respect to the lower half 3, as illustrated in FIG. 1, and both halves 2, 3 are joined together integrally as by set screws or by adhesion. Thereafter, labels are applied to the both surfaces of the cassette to complete a tape cassette. As shown in FIG. 1, the cassette is provided with a capstan aperture 15, a pair of cassette positioning apertures 16, 17 and a lug 18 which may be broken away to prevent an inadvertent erasure when the record contained therein is to be preserved.

Figure 4:
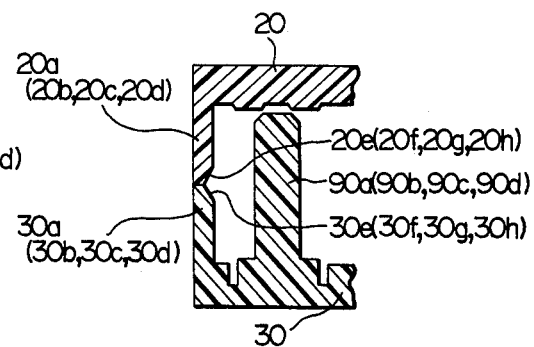
FIG. 4 is an enlarged fragmentary cross section of another tape cassette according to the invention.
Figure 5:
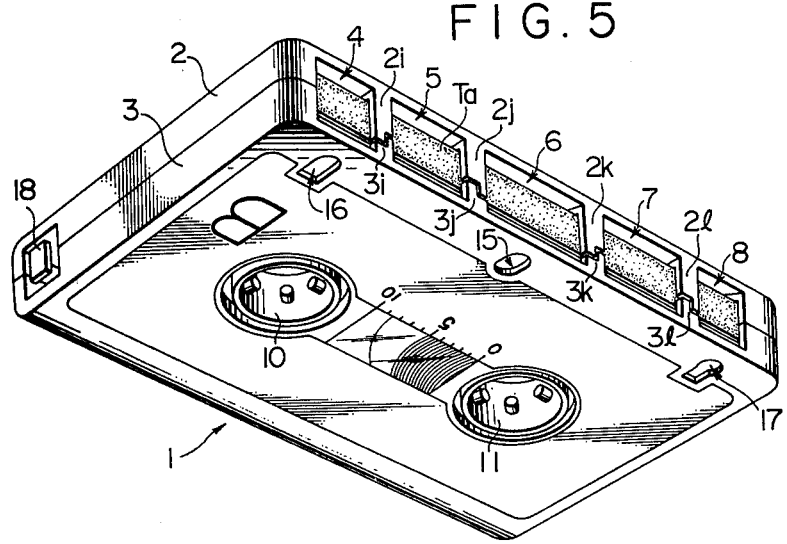
FIG. 5 is a perspective view of a magnetic tape cassette constructed in accordance with another embodiment of the invention, showing the cassette as it is viewed from the bottom side.

In the described embodiment, the lower half 3 is integrally formed with the partitioning posts 3a to 3d. However, in the arrangement shown in FIG. 4, both an upper cassette half 20 and a lower half 30 are each integrally formed with one-half of partitioning posts. Specifically, the upper halves 20a to 20d of posts integrally formed with the upper cassette half 20 and the lower halves 30a to 30d of posts integrally formed with the lower cassette half 30 constitute together a plurality of complete partitioning posts when both cassette halves are disposed in abutting relationship. The tip end of each post half is formed as a tapered surface 20e, 20f, 20g, 20h or 30e, 30f, 30g, 30h. Again the insertion of a tape portion into the clearance between the lower halves of partitioning posts 30a to 30c and tape guide pins 90a, 90b, 90c, 90d is facilitated, and both cassette halves 20, 30 can engaged each other without any accompanying likelihood of damaging the inserted tape.

Figure 6:
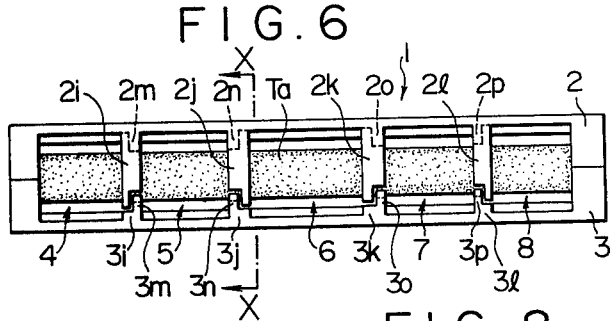
FIG. 6 is a front view of the cassette shown in FIG. 5.
Figure 7:
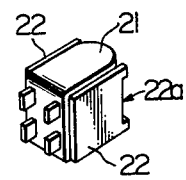
FIG. 7 is a perspective view of a magnetic head having tape guide member.
Figure 8:
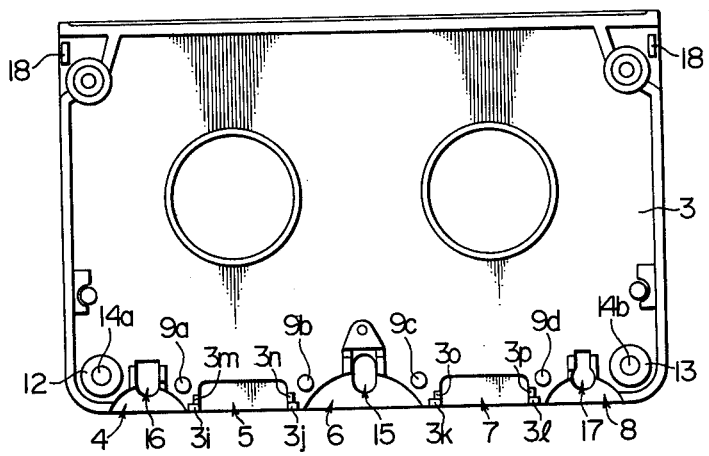
FIG. 8 is a plan view of a lower half of the cassette shown in FIG. 5 and showing the interior thereof.
Figure 9:
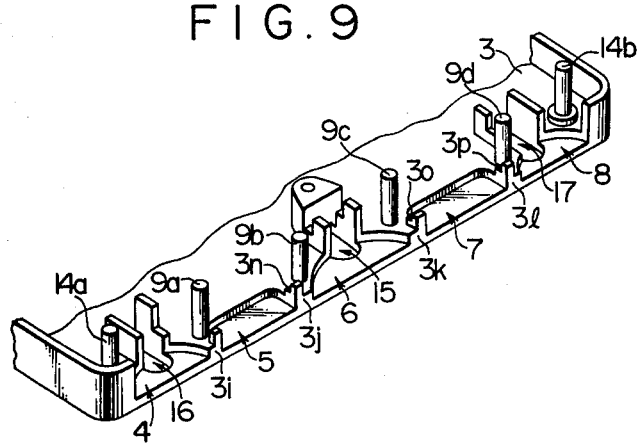
FIG. 9 is a fragmentary perspective view of the cassette half shown in FIG. 8.
Figure 10:
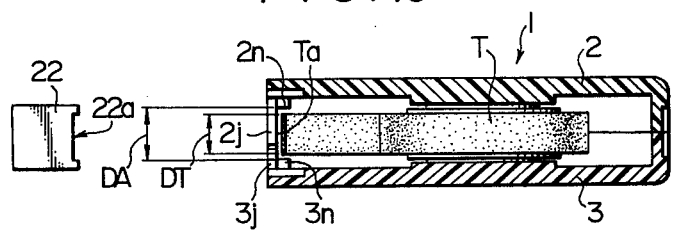
FIG. 10 is a cross section taken along the line X—X shown in FIG. 6.

FIGS. 5 to 10 show another embodiment of the cassette 1 in which the respective window slots 4 to 8 are formed by the abutment between the tip ends of partitioning posts 2i to 2l integrally formed with the upper cassette half 2 and those of partitioning posts 3i to 3l integrally formed with the lower cassette half 3. As before, a portion Ta of the magnetic tape extends inside and along the central portion of the respective window slots thus formed. Referring to FIG. 7, there is shown a magnetic head 21 which is adapted to be advanced into the window slot 5 or 7 and which is integrally provided with a pair of tape guide members 22 on its opposite lateral sides. The guide members 22 are formed with a notch 22a in its end which is located on the same side as the head surface, and these notches have a width slightly greater than the tape width, thereby allowing the tape portion Ta to be held against the head surface by passing it through the notches 22a as the head 21 is advanced into the window slot 5 or 7. However, if the tape portion Ta is crosswise misaligned, the tape portion Ta cannot enter the notches 22a, and is prevented from its bearing engagement with the head 21 as a result of its abutment against either projection on the upper or lower side of the respective notches 22a. To avoid this, in accordance with the invention, the lower cassette half 3 is integrally formed with a plurality of inwardly projecting edges 3m to 3p in close proximity to the rear surface of the partitioning posts 3i to 3l for preventing a displacement of the tape portion Ta crosswise downward as it runs across the window slots 4 to 8. Similarly, the upper cassette half 2 is formed with a plurality of inwardly projecting edges 2m to 2p in close proximity to the rear surface of the partitioning posts 2i 2l, as indicated in FIGS. 6 and 10, for preventing a displacement of the tape portion Ta crosswise upward. Each of the spaces formed between the edges 2m to 2p and corresponding edges 3m to 3p has a width DA which slightly exceeds the tape width DT (FIG. 10). It is desirable that the width DA corresponds to the length of notches 22a formed in the tape guide members 22 on the magnetic head 21. In practice, it is found than an effective value for the width DA is equal to the sum of DT plus 0.2 to 0.6mm.

With this arrangement, the tape portion Ta is located in a regular manner traversing across the central portion of the window slots 4 to 8, and since its vertical or crosswise displacement is limited by the inwardly projecting edges 2m to 2p and 3m to 3p, it can readily enter the notches 22a in the tape guide members 22 as the head is advanced into the associated window slot, even if the tape is not in a taut condition. The projection of these edges also prevents the tape from being disposed in the configuration of cone on the tape hubs, thus achieving a uniform frictional resistance to the tape running which assures an improved record/playback operation.

Figure 11:
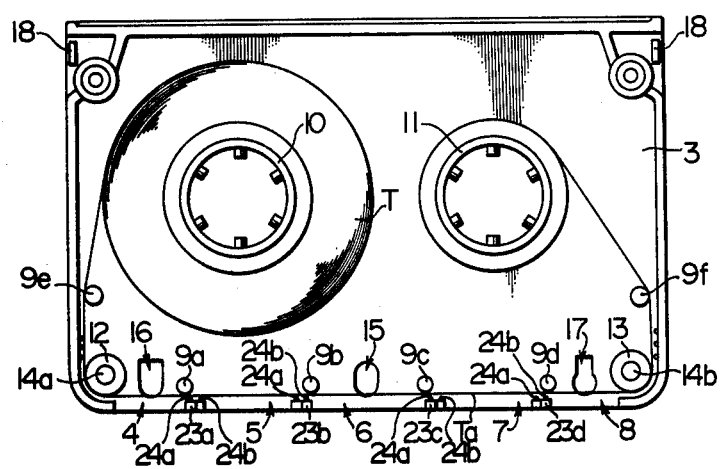
FIG. 11 is a plan view of a lower half of a magnetic tape cassette which is constructed in accordance with a further embodiment of the invention.

FIGS. 11 to 14 show another embodiment which eliminates the generation of a static electricity which usually results from frictional contact between the magnetic tape and the inner surface of the cassette. As shown in FIGS. 11 and 12, the cassette shown includes a plurality of partitioning posts 23a to 23d, each of which is provided with a pair of thin ribs 24a, 24b on its rear surface, that is, on the surface which faces the magnetic surface of a magnetic tape. FIG. 13 is an enlarged perspective view of one of the posts, and as shown, the ribs 24a, 24b are located on the rear surface of the post toward its opposite sides and extend in a direction perpendicular to the direction of running of the tape portion Ta. The projection of such thin ribs minimizes the area of contact with the magnetic surface of the tape, thereby permitting the triboelectric effect to be reduced so that it is substantially negligible. It should be understood that a single rib rather than the pair of ribs 24a, 24b may be employed. In a modification shown in FIG. 14, three uniformly spaced ribs 24c, 24d, 24e are provided on the rear surface of the partitioning posts 23a to 23d so as to extend a the direction parallel to the direction of tape running. In this instance, the opposite ends of each rib are rounded, avoiding interference with the tape running. Again, the triboelectric effect can be made negligible. The described ribs may be replaced by a dowel having a rounded end, the only requirement being that some form of protuberance be provided on the rear surface of the partitioning posts 23a to 23d for minimizing the area of contact with the tape.

As shown in FIG. 12, it is desirable that such protuberance be provided on the cassette sidewall in a region located between the tape guide rollers and guide pins, as illustrated by ribs 25a and 25b which are located on the side-wall intermediate guide rollers 12 and guide pins 9e and intermediate tape guide roller 13 and guide pin 9f inasmuch as the tape is disposed very close to the sidewall of the cassette is such region to thereby give rise to the generation of a static electricity by contact therewith.

FIGS. 15 and 16 illustrate an embodiment in which various pins, which are to be disposed within the cassette by being integrally molded with the cassette halves, are maintained in their completely upright position with respect to the plane of the major surfaces of the respective cassette halves. FIG. 15 is a plan view of the lower cassette half 3. When molding the cassette half 3 from a synthetic resin material, areas 28a to 28f of a reduced wall thickness are formed in the major surface of each cassette half intermediate a center 26 thereof and regions of tape guide pins 9a 9d as well as pins 14a, 14b on which guide rollers are mounted. In other words, these reduced areas are located immediately behind the respective pins 9a to 9d and 14a, 14b. Alternatively, the reduced areas may be formed between the respective pins and a gate 27 formed in the rear end face of the cassette half which is used for pouring a molten synthetic resin material. During the time required for the resin material to become set, the reduced thickness of the areas 28a to 28f permit these areas to be set initially. Since these areas are located on paths of flow of the resin material which might occur during the setting process, their early solidification permits the respective pins to be formed in their completely upright position relative to the horizontal surface 3A of the cassette half 3. In FIG. 15, there is shown a shaded central region 3B in the horizontal surface 3A which may be formed to a reduced wall thickness to achieve a similar effect.

Figure 17:
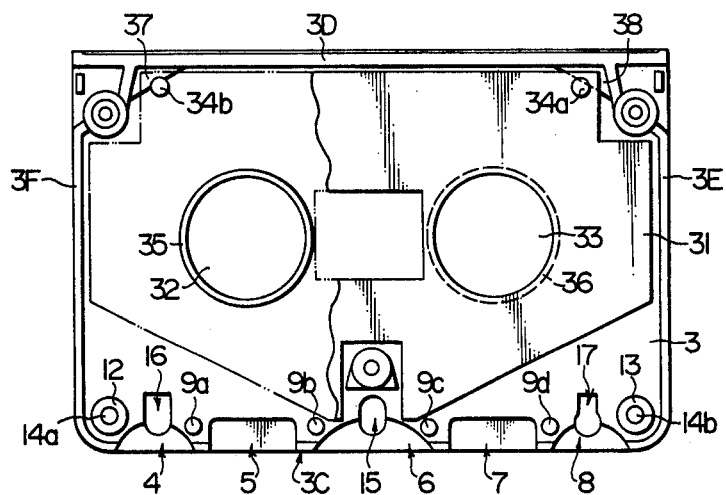
FIG. 17 is a plan interior view of the lower half of a magnetic tape cassette constructed in accordance with a still further embodiment of the invention.
Figure 18:
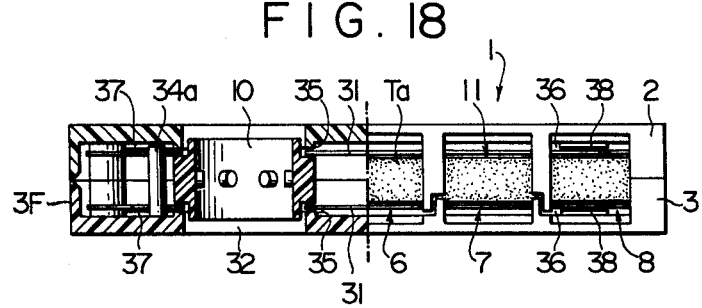
FIG. 18 is a front view, partly in section, of the tape cassette shown in FIG. 17.
Figure 19:
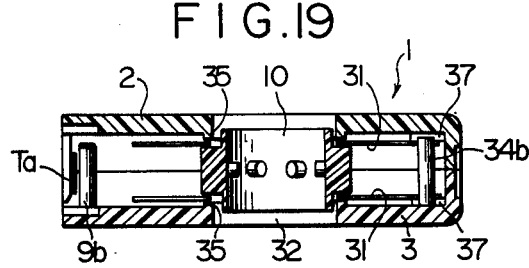
FIG. 19 is a fragmentary cross section of the tape cassette shown in FIG. 18.

FIGS. 17 to 19 illustrate an arrangement for optimum support of liner sheets within the cassette. FIG. 17 is a plan view of a lower cassette half 3 together with a liner sheet 31 disposed therein. As before, a magnetic tape cassette 1 (see FIGS. 1 and 5) is formed of a pair of upper and lower halves 2, 3 having substantially similar configurations and dimensions. A pair of liner sheets are disposed on the respect cassette halves so as to be located on the opposite sides of the magnetic tape when the two halves 2, 3 are joined together.

The cassette half shown is provided with a pair of openings 32, 33 in which to receive a pair of tape hubs 10, 11 (see FIGS. 1, 5 and 11) in a rotatable manner. The cassette half 3 is also formed with a pair of cassette positioning apertures 16, 17 at positions adjacent to the front end face 3C and toward the opposite sides and also at a central position toward the rear wall 3D. In addition, a capstan aperture 15 is formed centrally adjacent to the front end face 3C. A pair of liner sheet positioning pins 34a, 34b are located toward the opposite ends of the rear wall 3D for positioning the liner sheet 31. A pair of liner sheet bearing surfaces 35, 36 are formed by ribs extending around the openings 32, 33 and having a raised surface relative to the inner surface of the cassette half. Another pair of liner sheet bearing surfaces 37, 38 are formed by raised surfaces adjacent to the corners defined between the rear wall 3D and the right- and left-hand sidewalls 3E, 3F. The bearing surfaces 37, 38 are at the same elevation as the bearing surfaces 35, 36. The pair of liner sheet bearing surfaces 35 to 38 are also formed on the upper cassette half 2, as illustrated in FIGS. 18 and 19.

The liner sheet 31 has holes which are fitted over the positioning pins 34a, 34b, and in accordance with the invention, the liner sheet 31 is disposed in contact with the bearing surfaces 35 to 38 so that substantially no clearance is left between the sheet 31 and the edge or end face of the magnetic tape as a result of the bearing surfaces being raised from the inner surface of the cassette half. This assures that the edge face, in particular, the lower edge face, of the tape bears against the liner sheet 31, which is advantageous in preventing a movement of the tape up and down during the tape running, thus contributing to setting up an undistorted wound form of tape on the tape hub and to avoiding a non-uniform rotation of the tape hub. In addition, the misalignment in azimuth of the running tape with respect to the magnetic head, which may give rise to a non-uniform output therefrom, is avoided, producing an output signal of an improved quality. Since the liner sheet 31 is spaced from the inner surface of the cassette, it is free to flex, thereby preventing any increase in the frictional torque between the edge face of the tape and the liner sheet. Thus the tape running is improved in that such frictional torque is maintained constant.

Figure 20:
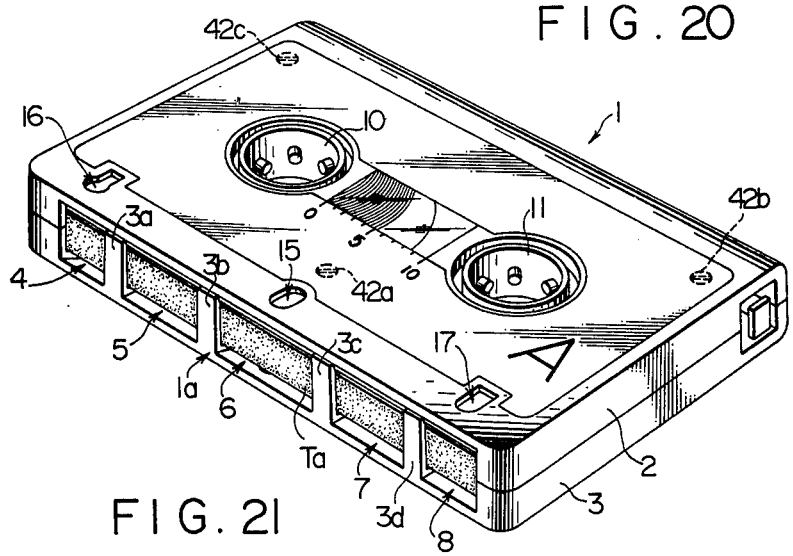
FIG. 20 is a perspective view of a magnetic tape cassette constructed in accordance with an additional embodiment of the invention.
Figure 21:
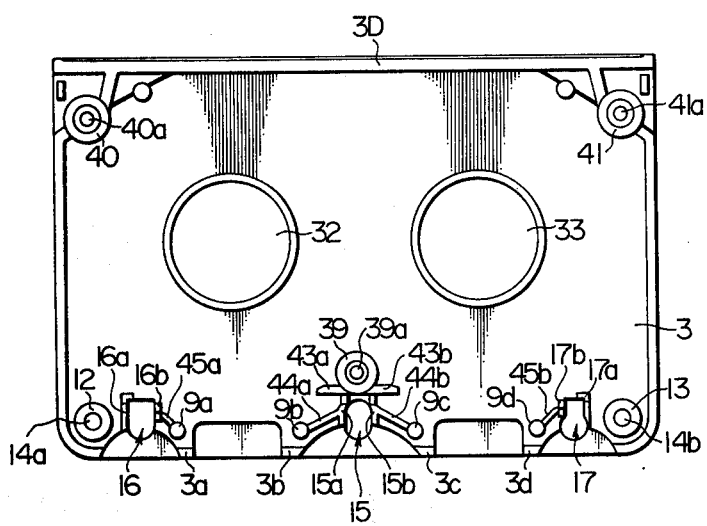
FIG. 21 is a plan interior view of the lower half of the cassette shown in FIG. 20.
Figure 22:
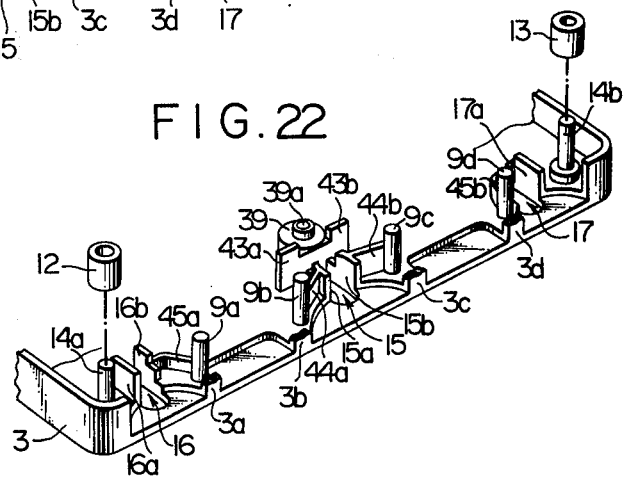
FIG. 22 is a fragmentary perspective view of the cassette half shown in FIG. 21.

In an arrangement shown in FIGS. 20 to 22, the upright position of tape guide pins disposed within the cassette is correctly maintained by the use of reinforcing walls. In FIGS. 21 and 22, the cassette half shown is provided with threaded mounts 39, 40, 41 which are respectively located immediately behind the capstan aperture 15 and adjacent to the opposite ends of the rear wall 3D and which are formed with threaded bores 39a, 40a, 41a for receiving set screws 42a, 42b, 42c (see FIG. 20) which are used to fasten the upper cassette half 2 (see FIG. 20) with the lower cassette half 3 shown. These mounts 39 to 41 are in the form of sleeves having an increased wall thickness. The threaded mount 39 located immediately behind the capstan aperture 15 is integrally formed with a pair of spring abutments 43a, 43b which extends laterally in opposite directions from the front side of the mount 39. These abutments cooperate with a pad carrying leaf spring (not shown), disposed within the cassette 1, for defining a fulcrum therefor. A pair of upstanding guide walls 15a, 15b extend from the inner periphery of the capstan aperture 15 for facilitating the insertion of the capstan into the aperture. These walls are connected with the front portion of the threaded mount 39. A pair of guide walls 16a, 16b or 17a, 17b extend vertically upward from the opposite sides of positioning apertures 16, 17, respectively, for facilitating the insertion of positioning pins, not shown.

The tape guide pins 9a to 9d, pins 14a, 14b on which to mount the guide rollers, the threaded mounts 39 to 41, the spring abutments 43a, 43b and the guide walls 15a, 15b, 16a, 16b, 17a, 17b are all integrally molded from a synthetic resin material at the same time as the cassette half 3 is molded. It will be appreciated that unless these pins, in particular the pins 9a to 9d, 14a and 14d, extend in a completely vertical direction from the horizontal surface of the cassette half 3, there may result a skewed tape position to degrade its contact with the magnetic head during the tape running, thus interfering with a satisfactory record/playback operation. In this respect, it will be understood that a difficulty is experienced in maintaining the tape guide pins 9b, 9c, in particular, which are located adjacent to the threaded mount 39 and the capstan aperture 15, in an accurately vertical position because the horizontal surface of the cassette half may be stressed when the screws 42a to 42c, inserted into the threaded bores in the threaded mounts 39 to 41, are tightened to join the both cassette halves together.

However, in accordance with the present embodiment, the tape guide pin 9b is connected with the guide wall 15a by means of a reinforcing wall 44a; the tape guide pin 9c is connected with the guide wall 15b by means of a reinforcing wall 44b; the tape guide pin 9a is connected with the guide wall 16b by means of a reinforcing wall 45a; and the tape guide pin 9d is connected with the guide wall 17b by means of a reinforcing 45b. These reinforcing walls 44a, 44b, 45a, 45b have a height which is the same as that of the guide walls 15a, 15b, which is in turn less than one-half the height of the tape guide pins 9a to 9d. In this manner, the pins 9a to 9d can be readily maintained in their vertical position when these pins are molded as a result of the existence of the reinforcing walls 44a, 44b, 45a, 45b. Also, the presence of the reinforcing walls 44a, 44b permits the tape guide pins 9b, 9c to be accurately maintained in their vertical position without causing a slant in their alignment when the screw 42a is tightened into the threaded mount 39.

Figure 23:
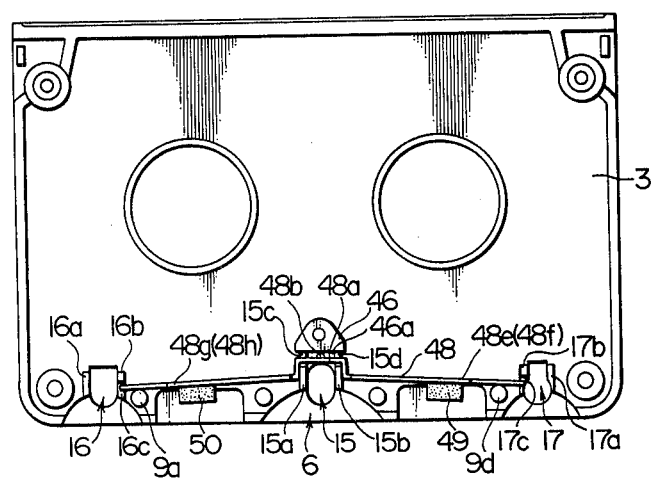
FIG. 23 is a plan interior view of the lower half of a magnetic tape cassette constructed in accordance with a further embodiment of the invention.
Figure 24:
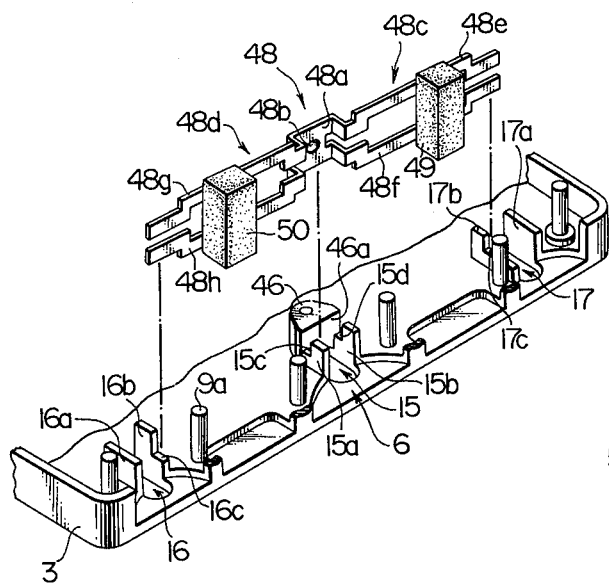
FIG. 24 is a fragmentary perspective view of the cassette half shown in FIG. 23 together with a pad carrying leaf spring which is shown as separated therefrom.
Figure 25:
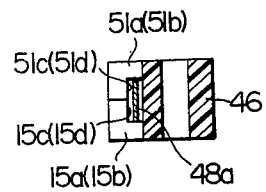
FIG. 25 is an enlarged fragmentary cross section of the leaf spring when retained in place.

FIGS. 23 to 25 show an arrangement for supporting a pad carrying leaf spring which is disposed within the cassette. FIG. 23 shows the pad carrying leaf spring disposed within the lower cassette half while FIG. 24 shows it as separated from the lower cassette half. The lower cassette half 3 is integrally molded with a spring abutment 46 of a trapezoidal form which is located immediately behind the capstan aperture 15. A pair of upstanding guide walls 15a, 15b are provided along the periphery of the capstan aperture 15 at positions which form right angles with respect to the tape portion Ta (see FIG. 11), generally as illustrated in FIGS. 23 and 24. As mentioned above in connection with the previous embodiment, these guide walls are integrally formed with the lower cassette half 3, and extend from the front face 46a of the spring abutment 46 toward the window slot 6 which is adapted to receive a pinch roller. A pair of notches 15c, 15d are formed in the guide walls 15a, 15b, respectively, at positions adjacent to the front surface 46a, and are adapted to receive a central portion 48a of a pad carrying leaf spring 48 to be described shortly.

Along the periphery of the cassette positioning apertures 16, 17 which are located adjacent to the opposite lateral sides of the cassette, pairs of upstanding guide walls 16a, 16b and 17a, 17b are integrally formed with the lower cassette half 3 so as to extend in a direction perpendicular to the tape portion Ta (see FIG. 11). Notches 16c, 17c are formed in the guide walls 16b, 17b, respectively, which are located nearer the guide walls 15a, 15b, respectively. Though the notches 15c, 15d are formed in the inner ends of the guide walls 15a, 15b, it will be noted that the notches 16c, 17c are formed in the outer ends of the guide walls 16b, 17b, and the free ends of the leaf spring 48 are disposed in these notches 16c, 17c. It will be appreciated that the upper cassette half (not shown) which forms a complete cassette together with the lower cassette half 3 shown is also formed with similar guide walls which correspond to the guide walls 15a, 15b, 16a, 16b, 17a, 17b.

As shown in FIGS. 23 and 24, the leaf spring 48 is formed of a resilient sheet material, and the central portion 48a thereof is recessed inward into the cassette in a channel configuration and has a nipple 48b formed thereon which defines a fulcrum for the spring. The length of the recessed portion is slightly longer than the spacing between the guide walls 15a, 15b. Vertically, the central portion 48a is recessed related to a pair of end portions 48c, 48d which extend in the opposite directions laterally from the central portion 48a. As shown in FIG. 24, these end portions are formed into a pair of elongate strips. Specifically, the right-hand end portion 48c comprises a pair of upper and lower elongate strips 48e, 48f while the left-hand end portion 48d comprises a pair of upper and lower elongate strips 48g, 48h. A tape pad 49 is adhesively secured across the strips 48e and 48f while another tape pad 50 is adhesively secured across the elongate strips 48g, 48h. The use of the leaf spring having its end portions formed into a pair of strips is advantageous in that the end portions have an increased flexibility so as to enable the magnetic heads to be brought into a favorable contact with the tape.

When mounting the spring 48 in the cassette, it is intially mounted into the lower cassette half 3 as shown in FIG. 24. The central portion 48a is disposed in the notches 15c, 15d formed in the guide walls 15a, 15b, and the free end of the end portions 48c, 48d is disposed in the notches 16c, 17c of the guide walls 16b, 17b, respectively. When the leaf spring 48 is disposed in this manner, its movement lengthwise or left to right i.e. either vice versa as viewed in FIG. 23, is limited by the bends in the central portion 48a which are located outside the respective guide walls 15a, 15b. A movement of the spring in a direction perpendicular to the front end face of the cassette is limited by the engagement between the central portion 48a and the notches 15c, 15d. In addition, a movement of the end portions 48c, 48d in a direction perpendicular to the front end face of the cassette is also limited by their engagement with the notches 16c, 17c. When the upper cassette half (not shown) is disposed in abutting relationship with the lower cassette half, the central portion 48a of the spring 48 is confined in a space defined by the notches 15c, 15d and corresponding notches 51c, 51d formed in associated guide walls 51a, 51b of the upper cassette half (see FIG. 5), so that its movement in the vertical direction is also limited.

With this arrangement, if the pads 49, 50 are urged by the magnetic heads through the tape to cause a flexure of the ends portions 48c, 48d of the spring 48, the spring 48 cannot be dislocated because of the pessure of the notches 15c, 15d and the notches 51c, 51d which limit the extent of movement of its central portion 48a in either back and forth, left to right or vice versa, or in the vertical direction. The tip end of each of the end portions 48c, 48d will bear against the rear side of the tape guide pins 9a and 9d, respectively. In this manner, the resilient action of the end portions of the spring 48 which urge the pads 49, 50 forwardly is limited by the guide pins 9a, 9d, preventing an unnecessary rocking motion of these end portions. It will be appreciated that the tape guide pins 9a, 9d function as stop pins for the free end of the spring 48 rather than a guide for the tape.

FIG. 26 shows an embodiment in which the pad response is improved by establishing the fulcrum for the pad carrying leaf spring on the spring. As before, a tape pad carrying leaf spring 58 is formed of a resilient sheet material of a reduced thickness, and is disposed rearwardly of the tape portion Ta so as to extend in parallel relationship therewith. The spring 58 has a central portion 58a which is recessed into the cassette in a channel configuration and which is located opposite to the front face 56a of a spring abutment 56, which is in turn integrally formed with the cassette body. A dowel 57 is formed on the front face 56a and is adapted to abut against the center of the central portion 58a so as to define a fulcrum for the spring 58. FIG. 27 is a perspective view of the spring abutment 56 on which the nipple or dowel 57 is formed. A pair of tabs 59a, 59b are punched from the central portion 58a of the leaf spring and bent at right angles to the plane thereof so as to engage the opposite lateral sides of the spring abutment 56 in a sandwiching manner. A pair of end portions 58b, 58c extend outwardly in opposite directions from the central portion 58a, and carry pads 52, 53 thereon.

Referring to FIG. 28(a), a leaf spring 68 has a nipple 68a thereon which is adapted to bear against a spring abutment 66 at a point PA which defines the fulcrum for the leaf spring. FIG. 28(b) shows a fulcrum formed according to the invention which is defined as a point PB on the leaf spring 58 by the abutment of the dowel 57 formed on the spring abutment 56 against the rear surface of the spring 58. By comparison, it is seen that the fulcrum is forwardly displaced by an amount corresponding to the height of the dowel. Hence, the distance from the fulcrum to one of the pads will be reduced by a corresponding amount, which is illustrated as $l_1 - l_2$, where $l_1$ represents the distance in the arrangement of FIG. 28(a) and $l_2$ the distance in the arrangement of FIG. 28(b). A reduced distance between the fulcrum and pad obviously improves the response of the pad carrying leaf spring to the magnetic head which bears against the pad. The improved response of the leaf spring in turn improves the tracking capability of the pad with respect to the magnetic head, thus enabling a satisfactory record/playback operation.

Figure 29:
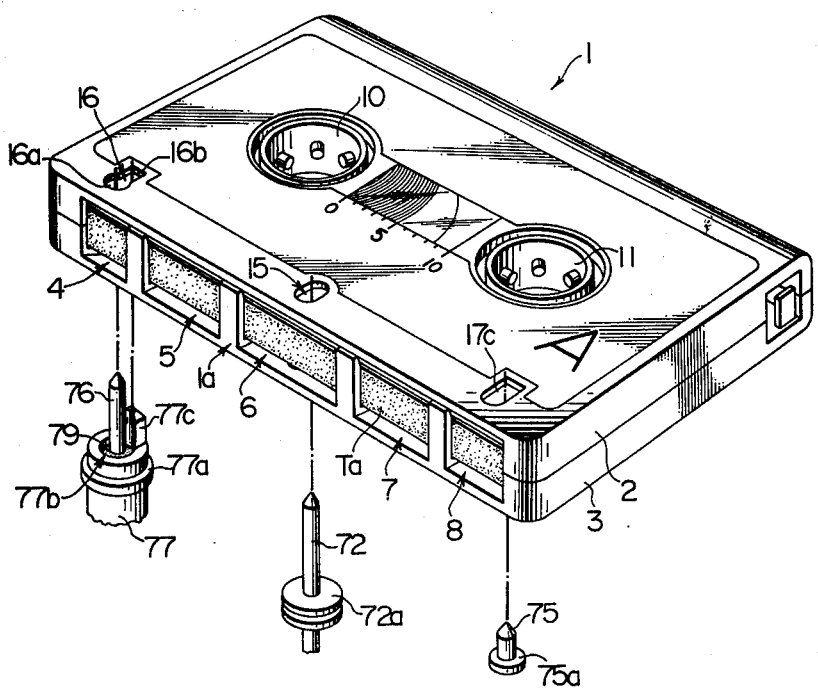
FIG. 29 is a perspective view of a magnetic tape cassette constructed in accordance with an additional embodiment of the invention.

FIGS. 29 to 33 show a further embodiment of the invention in which the cassette locating or positioning apertures formed in the tape cassette are modified so that the cassette may also be used in a cassette tape recorder of type having a pair of capstans which are adapted to feed the tape at a rated or uniform rate and at a higher rate, respectively. Referring to FIG. 29, formed in the front end face 1a of the cassette are window slots 4 to 8 as before. The central window slot 6 receives a pinch roller, the window slots 5, 7 receive record/playback heads, and the outermost window slots 4, 8 receive erase heads. A capstan aperture 15 is formed in the cassette immediately behind the central window slot 6 so as to extend through the upper and lower walls of the cassette 1. The aperture 15 is adapted to receive a capstan 77 which is designed to feed the tape Ta at a rated or uniform rate. Located on opposite sides of the capstan aperture 15 or at positions immediately behind the window slots 4, 8, are a pair of cassette positioning apertures 16, 17c which are formed in vertical alignment in the upper and lower walls of the cassette. When mounting the cassette 1 on a tape recorder of the type described, these apertures are fitted over cassette positioning pins 75 (only one being shown). As will be noted from FIGS. 29, 31, in the tape cassette 1 according to the invention, the cassette positioning apertures 16, 17c extend beyond the tape portion Ta toward the window slots 4, 8. At least one of the positioning apertures, namely 16 in the example shown, is shaped like a key-hole. In its forward portion, the aperture 16 includes a circular opening 16a which is adapted to receive a capstan 76 designed to feed the tape Ta at a higher rate. The circular form of the opening 16a facilitates the insertion and rotation of the capstan 76. The aperture 16 has a reduced or restricted dimension, as viewed in the direction of tape running, in its region extending rearwardly from the circular opening 16a, thereby forming a positioning opening 16b. The purpose of shaping the aperture 16 in this configuration is to allow the cassette to be correctly positioned in the lateral or left-to-right direction as well as in the back and forth direction when the cassette is engaged with the positioning pin 75.

Figure 30:
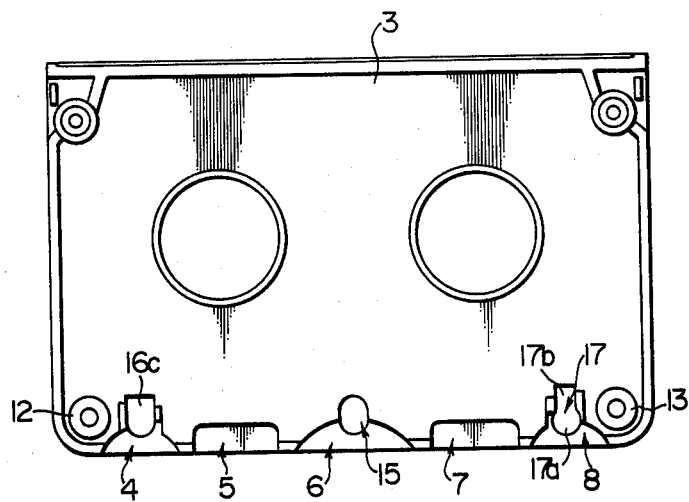
FIG. 30 is an interior plan view of the lower half of the cassette shown in FIG. 29.

The key-hole shaped aperture 16 formed in the upper cassette half 2 is aligned with a positioning aperture 16c formed in the lower cassette half 3 which is shaped in the same configuration as the right-hand positioning aperture 17c in the upper cassette half 2 and thus has the same width as the diameter of the circular or semi-circular opening formed in its forward end, as illustrated in FIG. 30. However, the positioning aperture 17 formed in the lower cassette half 3 which is aligned with the right-hand positioning aperture 17c in the upper cassette half 2 is shaped in the same configuration as the left-hand positioning aperture 16 formed in the upper cassette half 2, as illustrated in FIG. 30, thus having a positioning area 17b of a reduced width and a circular opening 17a.

Figure 32:
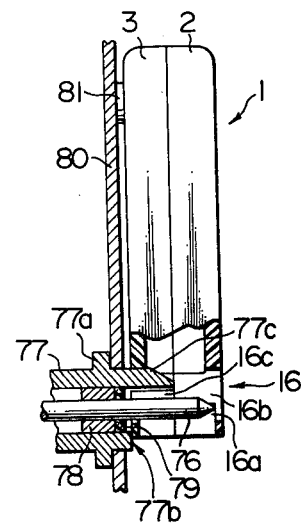
FIG. 32 is a fragmentary cross section taken along the line Y—Y shown in FIG. 31.

As shown in FIGS. 29 and 32, the capstan 76 which is designed to feed the tape at a higher rate is rotatably disposed inside a pipe 77 having a flange 77a, by utilizing an oilless metal 78 and a member 79 which serves to prevent an attachment of oil. The capstan 76 has a portion projecting upwardly beyond the pipe 77 for insertion into the circular opening 16a or 17a of the positioning aperture 16 or 17, respectively. The member 79 is formed of a felt or like material for preventing an attachment of oil to the cassette 1. The flange 77a is utilized in mounting the pipe 77 on a base plate 80 of the tape recorder, and the pipe 77 extends above the base plate 80 so as to have its free end disposed flush with the upper surface of cassette receiving members 81 which are mounted on the base plate 80. This end face 77b also serves maintain the cassette 1 in a horizontal position. Around part of the periphery of the end face 77b, the pipe has a cassette positioning member 77c formed therewith which extends upwardly in parallel relationship with the capstan 76. The member 77c is integral with the pipe 77 and has a height which is equal to the height of the positioning pin 75. The circumferential width of the member 77c may be equal to or slightly less than the dimension of the positioning openings 16c, 17c in the direction of tape running.

Figure 31:
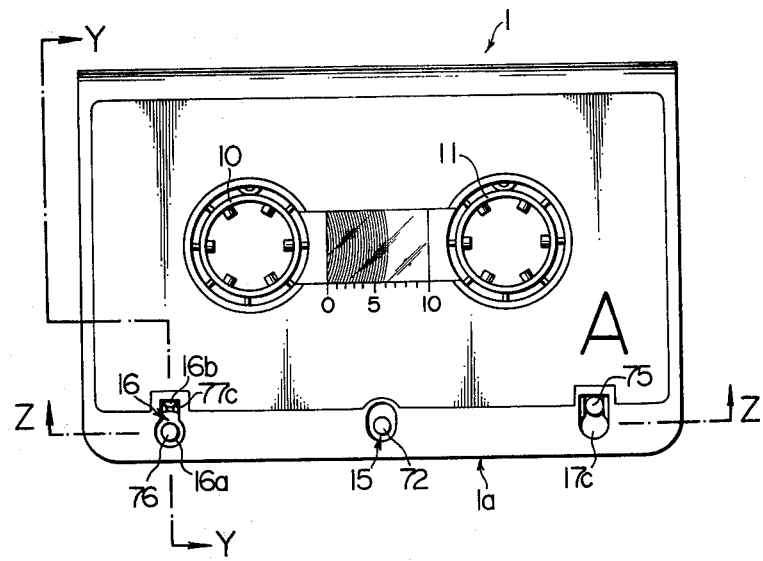
FIG. 31 is a plan view of the tape cassette shown in FIG. 29.
Figure 33:
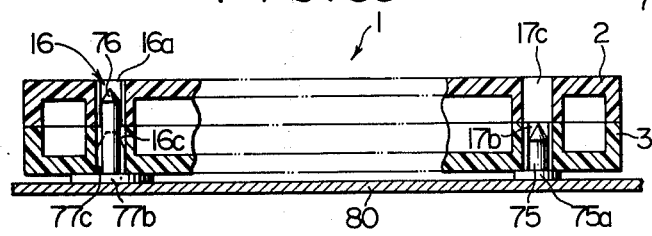
FIG. 33 is an end view taken along the line Z—Z shown in FIG. 31.

As shown in FIGS. 31, 32 and 33, when the tape cassette 1 thus constructed is mounted on the base plate 80, positioning pin 75 fits tightly in the positioning opening 17b of the right-hand positioning aperture 17 formed in the lower cassette half 3 while the cassette positioning member 77c and the capstan 76 fit in the left-hand positioning aperture 16 of the cassette 1. The capstan 76 extends through the positioning opening 16c in the lower cassette half 3 and has its free end located within the circular opening 16a of the positioning aperture 16 formed in the upper cassette half 2, and the cassette positioning member 77c is located in the rear portion of the positioning opening 16c (see FIGS. 31 and 32).

Since the pin 75 and the member 77c are substantially a close fit in the respective openings or apertures 17b, 16c, the cassette 1 is accurately located in the lateral direction, without involving any rattling. Since the rear end face of the cassette is centrally urged by a spring to move forwardly as it is mounted on the recorder, the rear wall of the positioning opening or aperture 17b, 16c bears against the rear portion osf the pin 75 or the member 77c, respectively (see FIG. 31). In other words, both the pin 75 and the member 77c are engaged by the cassette walls at three locations, and since the cassette 1 is forwardly biased, it is correctly located on the recorder.

Horizontal position of the cassette 1 as mounted is maintained by a flange 75a on the pin 75, the flange 77b of the pipe 77 and the end face of the cassette receiving members 81, on which the bottom surface of the cassette 1 rest, as illustrated in FIGS. 32 and 33. The capstan 76, extending through the positioning opening 16c and extending into the circular opening 16a of the aperture 16, is located rearwardly of the tape portion Ta, so that when another pinch roller is advanced into the window slot 4 under this condition, they cooperate to feed the tape portion Ta at a higher rate.

In this embodiment, the window slot 4 is utilized to receive another pinch roller, so that it is necessary that an erase head may be combined with a record/playback head into a single housing which can be advanced into the window slot 5 or 7.

It should be understood that when the cassette 1 is reversed upside down, the cassette positioning apertures and the capstan aperture operate in the similar manner as mentioned above. In FIG. 29, it is to be noted that the capstan 72 carries a pulley 72a thereon which may be engaged by a belt for rotating a drive shaft associated with one of the tape hubs. In this manner, a slight modification of the cassette positioning apertures permits the cassette of the invention to be directly used in a tape recorder having a pair of capstans.

What is claimed is:

1. A magnetic tape cassette including a pair of upper and lower cassette halves molded from a synthetic resin material and having a generally similar configuration and dimension, said cassette halves being disposed in abutting relationship at their opening ends to be joined together to define a substantially flat rectangular cassette body, one lateral end face of which has a greater dimension than other end faces disposed at right angles thereto being formed as a front end face; the cassette comprising a window slot centrally formed in the front end face by a pair of partitioning posts integrally formed with the cassette half or halves for receiving a pinch roller, a pair of window slots symmetrically formed in front end face on the opposite sides of the first mentioned window slot by similar partitioning posts for receiving magnetic heads, an aperture formed adjacent to the front end face in alignment with the window slot associated with the pinch roller so as to extend vertically through the cassette halves, the aperture receiving a capstan, a spring abutment formed with one of the cassette halves immediately behind the capstan aperture, a pair of cassette positioning apertures formed toward the opposite ends of the front end face so as to vertically extend through the cassette halves, a pair of openings vertically extending through the cassette halves for receiving a pair of tape hubs, including a tape supply and a tape take-up hub rotatably disposed in the respective openings, a length of magnetic tape disposed on the tape supply hub and extending therefrom along the respective window slots while maintaining its magnetic surface in parallel relationship with the plane thereof to be taken up on the tape take-up hub, a plurality of tape guide pins and tape guide rollers located so as to cause the magnetic tape to extend along the respective window slots, one of said cassette halves including areas of a reduced wall thickness in its central portion which includes the tape hub openings and at positions rearwardly of at least some of said guide pins which are integrally molded with said one of said cassette halves, the areas of reduced wall thickness serving to maintain the pins in their upright position, a pair of liner sheets disposed on the opposing inner surfaces of the cassette halves for providing a smooth running of the magnetic tape, and a pad carrying leaf spring disposed between a portion of the tape length which extends along the window slots and the spring abutment and carrying a pair of tape pads which cause the tape to be urged against a magnetic head or heads which are advanced into the window slot or slots associated with the magnetic heads.

2. A magnetic tape cassette including a pair of upper and lower cassette halves molded from a synthetic resin material and having a generally similar configuration and dimension, said cassette halves being disposed in abutting relationship at their opening ends to be joined together to define a substantially flat rectangular cassette body, one lateral end face of which has a greater dimension than other end faces disposed at right angles thereto being formed as a front end face; the cassette comprising a window slot centrally formed in the front end face by a pair of partitioning posts integrally formed with the cassette half or halves for receiving a pinch roller, a pair of window slots symmetrically formed in the front end face on the opposite sides of the first mentioned window slot by similar partitioning posts for receiving magnetic heads, a capstan aperture formed adjacent to the front end face in alignment with the window slot associated with the pinch roller so as to extend vertically through the cassette halves, a spring abutment formed with one of the cassette halves immediately behind the capstan aperture, said capstan aperture being formed with at least one guide wall extending in a direction perpendicular to the direction of tape running and located around the capstan aperture, the guide wall or walls being formed with a notch or notches for supporting the pad carrying leaf springs; a pair of cassette positioning apertures formed toward the opposite ends of the front end face so as to vertically extend through the cassette halves, a pair of openings vertically extending through the cassette halves for receiving a pair of tape hubs, including a tape supply and a tape take-up hub rotatably disposed in the respective openings, a length of magnetic tape disposed on the tape supply hub and extending therefrom along the respective window slots while maintaining its magnetic surface in parallel relationship with the plane thereof to be taken up on the tape take-up hub, a plurality of tape guide pins and tape guide rollers located so as to cause the magnetic tape to extend along the respective window slots, a pair of liner sheets disposed on the opposing inner surfaces of the cassette halves for providing a smooth running of the magnetic tape, and a pad carrying leaf spring disposed between a portion of the tape length which extends along the window slots and the spring abutment and carrying a pair of tape pads which cause the tape to be urged against a magnetic head or heads which are advanced into the window slot or slots associated with the magnetic heads.

3. A magnetic tape according to claim 2 wherein said at least one guide wall is connected with the adjacent tape guide pin or pins by means of reinforcing wall means.

4. A magnetic tape cassette including a pair of upper and lower cassette halves molded from a synthetic resin material and having a generally similar configuration and dimension, said cassette halves being disposed in abutting relationship at their opening ends to be joined together to define a substantially flat rectangular cassette body, one lateral end face of which has a greater dimension than other end faces disposed at right angles thereto being formed as a front end face; the cassette comprising a window slot centrally formed in the front end face by a pair of partitioning posts integrally formed with the cassette half or halves for receiving a pinch roller, a pair of window slots symmetrically formed in the front end face on the opposite sides of the first mentioned window slot by similar partitioning posts for receiving magnetic heads, an aperture formed adjacent to the front end face in alignment with the window slot associated with the pinch roller so as to extend vertically through the cassette halves, the aperture receiving a capstan, a spring abutment formed with one of the cassette halves immediately behind the capstan aperture, first and second cassette positioning apertures formed toward the opposite ends of said front end face so as to vertically extend through the cassette halves, said first cassette positioning aperture being defined by a first opening in said upper cassette half and a second opening in said lower cassette half, said first opening having a keyhole shape including a first circular portion and a second thin portion extending from said circular portion, said thin portion having a dimension adapted to closely receive a capstan projecting from said tape recorder, said second opening having an arch shape adapted to receive both a capstan and a cassette positioning element, said second cassette position aperture being defined by a third opening in said upper cassette half and a fourth opening in said lower cassette half, said fourth opening having a keyhole shape including a first circular portion and a second thin portion extending from said circular portion, said thin portion having a dimension adapted to closely receive a capstan projecting from said tape recorder, said third opening having an arch shape adapted to receive both a capstan and a cassette positioning element, a pair of openings vertically extending through the cassette halves for receiving a pair of tape hubs, including a tape supply and a tape take-up hub rotatably disposed in the respective openings, a length of magnetic tape disposed on the tape supply hub and extending therefrom along the respective window slots while maintaining its magnetic surface in parallel relationship with the plane thereof to be taken up on the tape take-up hub, a plurality of tape guide pins and tape guide rollers located as as to cause the magnetic tape to extend along the respsective window slots, a pair of liner sheets disposed on the opposing inner surfaces of the cassette halves for providing a smooth running of the magnetic tape, and a pad carrying leaf spring disposed between a portion of the tape length which extends along the window slots and the spring abutment and carrying a pair of tape pads which cause the tape to be urged against a magnetic head or heads which are advanced into the window slot or slots associated with the magnetic heads.

5. A magnetic tape cassette according to claim 4 in which the partitioning posts each have an inner surface on its free end which tapers outwardly.

6. A magnetic tape cassette according to claim 4 in which the partitioning posts have an inwardly projecting edge formed on the inner surface in its juncture region with the respective cassette halves, the edge limiting a crosswise movement of the magnetic tape.

7. A magnetic tape cassette according to claim 4 in which each of the cassette halves is formed with thin or small protuberances on their inner surface for contact with the magnetic surface of the magnetic tape.

* * * * *